United States Patent
Kao et al.

(10) Patent No.: US 11,477,038 B2
(45) Date of Patent: Oct. 18, 2022

(54) CERTIFICATE TRANSFER SYSTEM AND CERTIFICATE TRANSFER METHOD

(71) Applicant: MOXA INC., New Taipei (TW)

(72) Inventors: Chi-Yuan Kao, New Taipei (TW);
Yu-Chen Kao, New Taipei (TW);
Hung-Chun Chen, New Taipei (TW);
Chih-Hsiung Shih, New Taipei (TW)

(73) Assignee: MOXA INC., New Taipei (TW)

( * ) Notice: Subject to any disclaimer, the term of this patent is extended or adjusted under 35 U.S.C. 154(b) by 174 days.

(21) Appl. No.: 17/146,846

(22) Filed: Jan. 12, 2021

(65) Prior Publication Data
US 2022/0078032 A1 Mar. 10, 2022

(30) Foreign Application Priority Data

Sep. 8, 2020 (TW) ................................. 109130729

(51) Int. Cl.
*H04L 9/00* (2022.01)
*H04L 9/08* (2006.01)
*H04L 9/32* (2006.01)

(52) U.S. Cl.
CPC ............ *H04L 9/3268* (2013.01); *H04L 9/006* (2013.01); *H04L 9/0825* (2013.01); *H04L 9/3265* (2013.01); *H04L 9/50* (2022.05)

(58) Field of Classification Search
CPC ..... H04L 9/3268; H04L 9/006; H04L 9/0825; H04L 9/3265; H04L 9/50; H04L 9/3247; H04L 63/0823; H04L 63/0442
See application file for complete search history.

(56) References Cited

U.S. PATENT DOCUMENTS

| | | | |
|---|---|---|---|
| 9,634,841 B2* | 4/2017 | De Los Santos | H04L 63/126 |
| 2004/0111609 A1* | 6/2004 | Kaji | H04L 9/006 |
| | | | 713/156 |
| 2005/0204164 A1* | 9/2005 | Kakii | H04L 9/3268 |
| | | | 726/5 |
| 2020/0015087 A1* | 1/2020 | Pak | H04W 12/03 |
| 2020/0274721 A1 | 8/2020 | Melo et al. | |

OTHER PUBLICATIONS

European Search Report dated May 19, 2021, issued in application No. EP 20216624.5.

* cited by examiner

*Primary Examiner* — Carl G Colin
*Assistant Examiner* — Hany S. Gadalla
(74) *Attorney, Agent, or Firm* — McClure, Qualey & Rodack, LLP

(57) ABSTRACT

A certificate transfer system includes a first certificate management host and a certificate transfer management host. The first certificate management host is configured to generate a first certificate, sign an electronic device with the first certificate, and transmit a first Internet address to the electronic device to complete a certificate-issuance operation. The certificate transfer management host is configured to store a transfer device list and a second Internet address. When the first certificate management host receives the first certificate issued by the electronic device, the first certificate management host verifies that the first certificate is correct and determines that if the first certificate matches one of the certificates in the transfer device list, the first certificate management host returns the certificate transfer management host address to the electronic device.

14 Claims, 4 Drawing Sheets

CERTIFICATE TRANSFER SYSTEM AND CERTIFICATE TRANSFER METHOD

CROSS REFERENCE TO RELATED APPLICATIONS

This application claims priority of Taiwan Patent Application No. 109130729, filed on Sep. 8, 2020, the entirety of which is incorporated by reference herein.

BACKGROUND OF THE INVENTION

Field of the Invention

The present disclosure relates to a transfer system and, in particular, to a certificate transfer system and a certificate transfer method.

Description of the Related Art

Traditionally, serial numbers and passwords are used to identify devices that can be connected to the Internet. However, the method of using a serial number with a password may have the following risks and problems. The serial number of the device may be repeated. In a closed network environment (such as internal devices in a company), each device can be assigned a unique serial number. However, in an open Internet environment, multiple devices may correspond to duplicate serial numbers. Once the identity of a device cannot be confirmed, there is a risk of leakage of confidential information. In addition, the serial number is a series of regular consecutive numbers. As long as hackers understand the rules, it is very easy to alter the serial number. Because this method is easy for hackers to crack, especially when the number of networked devices is large and located far away, it is difficult for device managers to set different passwords for the devices one by one. The most common practice is to use the same password for each device, which increases the insecurity of device data obtained by hackers. Furthermore, using the serial number with the password only provides the back-end host device with a method to verify the identity of the networked device, but it cannot allow the networked device to verify the identity of the back-end host device.

Therefore, how to allow networked devices to automatically transfer certificates has become one of the problems that need to be solved in this field.

BRIEF SUMMARY OF THE INVENTION

In order to solve the above problems, the present disclosure provides a certificate transfer system. The certificate transfer system includes a first certificate management host and a certificate transfer management host. The first certificate management host is configured to generate a first certificate, sign an electronic device with the first certificate, and transmit a first Internet address to the electronic device to complete the certificate-issuance operation. The certificate transfer management host is configured to store a transfer device list and a second Internet address. When the first certificate management host receives the first certificate issued by the electronic device, the first certificate management host verifies that the first certificate is correct and determines that if the first certificate matches one of the certificates in the transfer device list. The first certificate management host then returns the certificate transfer management host address to the electronic device. The first certificate is sent by the electronic device to the certificate transfer management host according to the certificate transfer management host address. The certificate transfer management host verifies that the first certificate is correct. The certificate transfer management host then sends the second Internet address to the electronic device.

In accordance with one feature of the present invention, the present disclosure provides a certificate transfer method that includes the following steps. A first certificate is generated by a first certificate management host. An electronic device with the first certificate is signed, and a first Internet address is transmitted to the electronic device to complete the certificate-issuance operation. A transfer device list and a second Internet address are stored by a certificate transfer management host. When the first certificate management host receives the first certificate issued by the electronic device, the first certificate management host verifies that the first certificate is correct and determines that if the first certificate matches one of the certificates in the transfer device list. Then, the first certificate management host returns the certificate transfer management host address to the electronic device. The first certificate is sent by the electronic device to the certificate transfer management host according to the certificate transfer management host address. The certificate transfer management host verifies that the first certificate is correct. The certificate transfer management host then sends the second Internet address to the electronic device.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

BRIEF DESCRIPTION OF THE DRAWINGS

In order to describe the manner in which the above-recited and other advantages and features of the disclosure can be obtained, a more particular description of the principles briefly described above will be rendered with reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
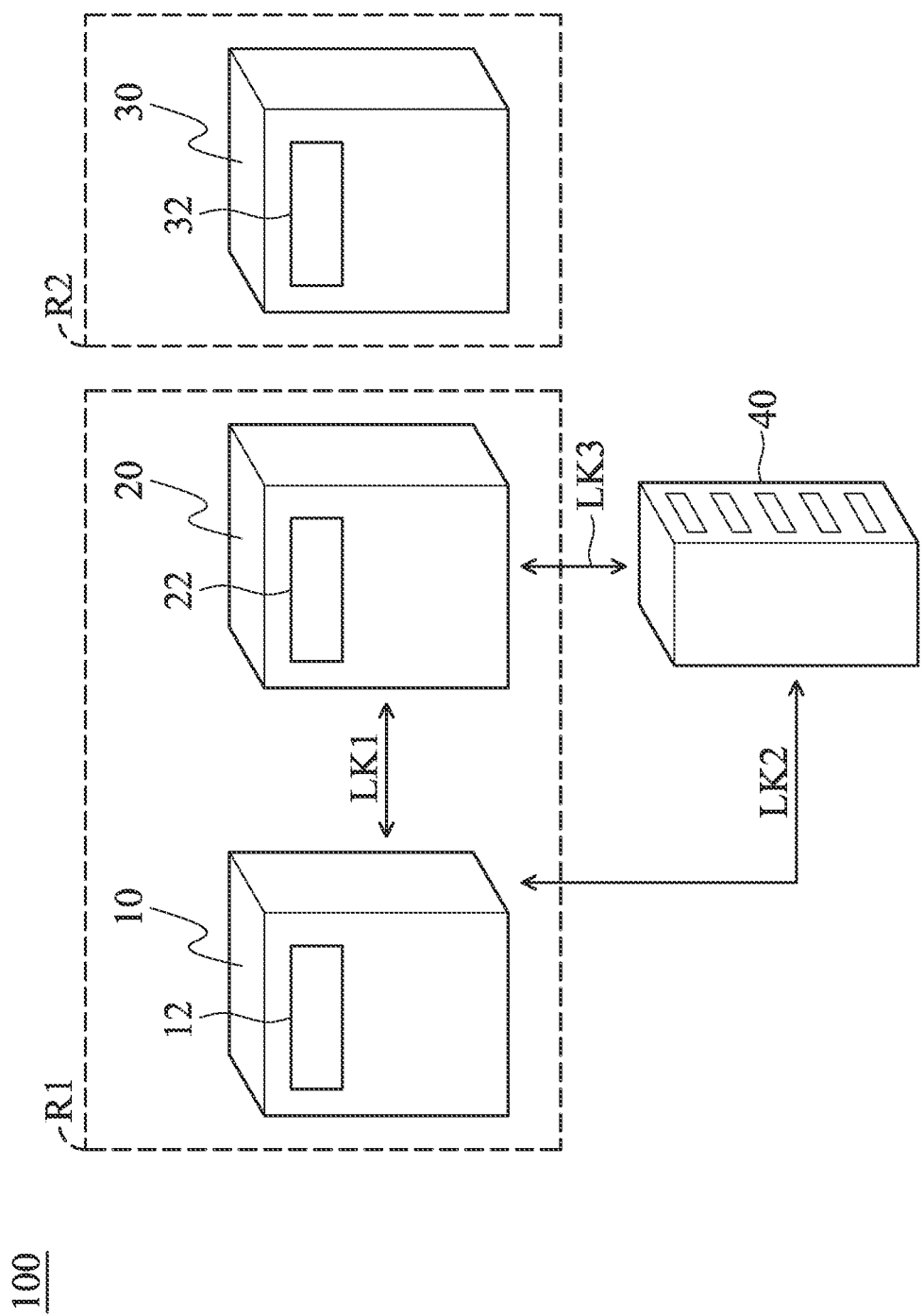
FIG. 1 is a schematic diagram of a certificate transfer system 100 in accordance with one embodiment of the present disclosure.
Figure 2:
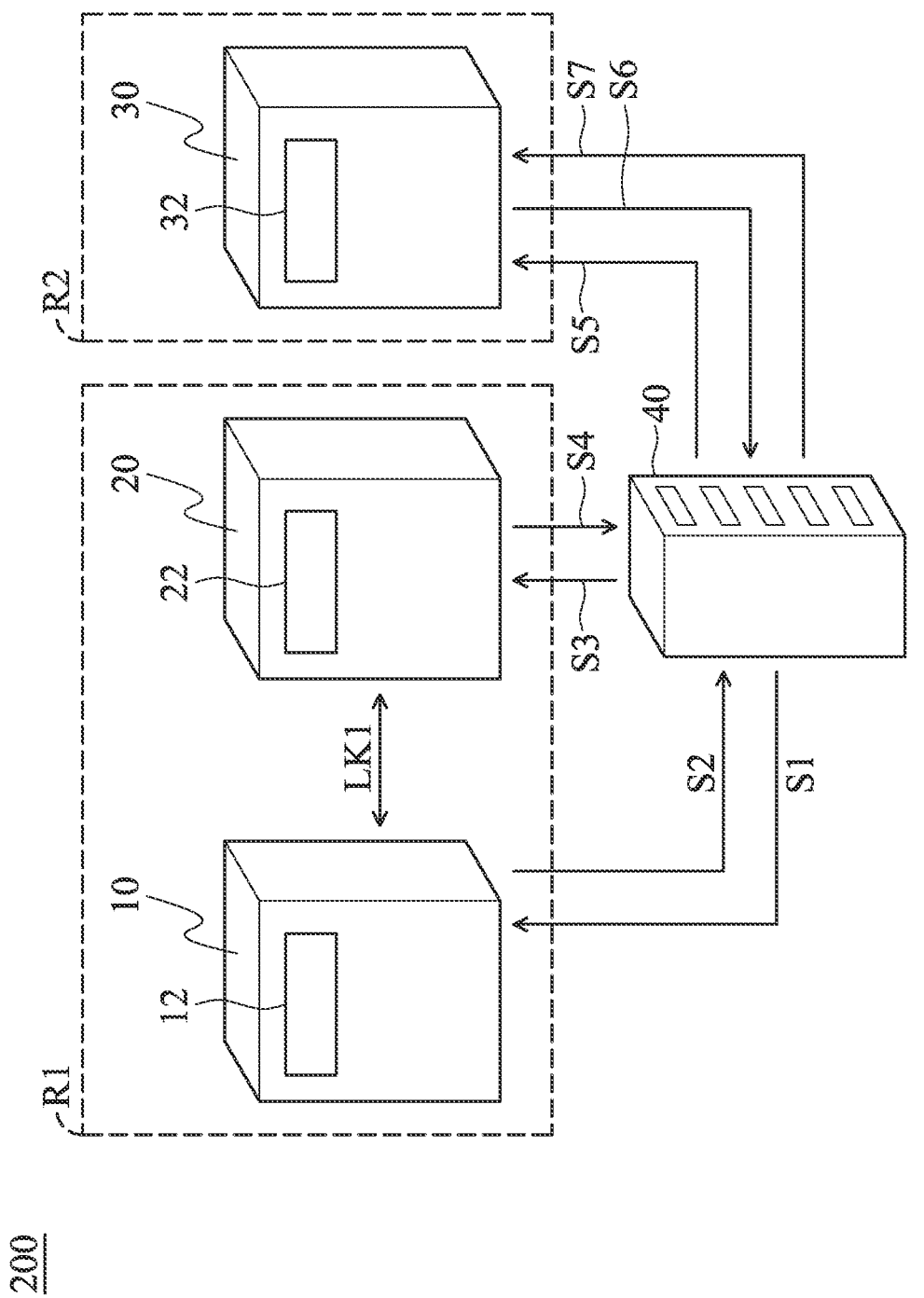
FIG. 2 is a schematic diagram of a certificate transfer method 200 in accordance with one embodiment of the present disclosure.

Please refer to FIGS. 1 and 2, FIG. 1 is a schematic diagram of a certificate transfer system 100 in accordance with one embodiment of the present disclosure. FIG. 2 is a schematic diagram of a certificate transfer method 200 in accordance with one embodiment of the present disclosure.

In one embodiment, as shown in FIG. 1, the certificate transfer system 100 includes a first certificate management host 10 and a certificate transfer management host 20. In one embodiment, the certificate transfer system 100 includes a first certificate management host 10, a certificate transfer management host 20, a second certificate management host 30, and an electronic device 40.

In one embodiment, the first certificate management host 10 and the certificate transfer management host 20 establish a communication link LK1 via wireless communication (for example, using Wi-Fi, 3G, 4G, 5G, LTE, etc.) or wired communication. The electronic device 40 and the first certificate management host 10 establish a communication link LK2 by wireless communication (for example, using Wi-Fi, 3G, 4G, 5G, LTE, etc.) or wired communication. The electronic device 40 and the second certificate management host 20 establish a communication link LK3 through wireless communication (for example, using Wi-Fi, 3G, 4G, 5G, LTE, etc.) or wired communication.

In one embodiment, the electronic device 40 is a device with a networking function, such as a mobile phone, a tablet, a laptop, etc.

In one embodiment, the first certificate management host 10, the certificate transfer management host 20, and the second certificate management host 30 can be servers, computers, or other devices with computing capabilities.

In one embodiment, the first certificate management host 10 includes an intermediate certificate device 12, the certificate transfer management host 20 includes an intermediate certificate device 22, and the second certificate management host 30 includes an intermediate certificate device 32, respectively. In one embodiment, intermediate certificate devices 12, 22 and 32 respectively can be implemented by an integrated circuit such as a micro controller, a microprocessor, a digital signal processor, an application specific integrated circuit (ASIC), or a logic circuit. In one embodiment, the intermediate credential device 22 can be implemented by software, firmware, or hardware. Since the root certificate must be placed behind several layers of security protection, the intermediate certificate devices 12, 22 and 32 are used as proxy devices to ensure that the key of the root certificate is absolutely inaccessible. Since the root certificate itself signs the intermediate certificate, the intermediate certificate can be used to sign the Secure Sockets Layer (SSL) for installation and maintenance. This is a standard technology, so it won't repeat here.

In an embodiment, the X.509 certificate chain technology can be a multi-layered architecture (such as a tree structure). Each level certificate can be pushed up to the root certificate. The certificate signed to the last level (without sub-certificates) is called a leaf certificate. This feature of X.509 certificate chain technology can be used more flexibly on multiple model devices. For example, the first type of model equipment of a company (for example, 100 model equipment) is signed with a layer of intermediate certificate (for example, using 100 intermediate certificates). The second type of model equipment (for example, 200 model equipment) is signed with another layer of intermediate certificates (for example, using 200 other layer of intermediate certificates). Therefore, the use of X.509 certificate chain technology can make the issuance of certificates more flexible.

In one embodiment, the certificates (such as, the first certificate and the second certificate described later) used in this case are all leaf certificates.

In one embodiment, before the electronic device 40 is shipped from the factory, for example, the electronic device 40 is located on the device production line, the electronic device 40 can issue a dedicated first certificate through a certificate management method.

In one embodiment, the first certificate management host 10 generates a first certificate, signs the electronic device 40 with the first certificate, and transmits a first Internet address to the electronic device 40. The electronic device 40 stores the first Internet address and the first certificate to complete a certificate-issuance operation. After the electronic device 40 is signed with the first certificate, the electronic device 40 can be prepared to leave the factory. The first certificate management host 10 can be, for example, a server of a company that produces the electronic device 40. In this way, the signing of the electronic device 40 by the first certificate management host 10 is completed.

In one embodiment, the certificate transfer management host 20 is used to store a transfer device list and a second Internet address. In one embodiment, before the electronic device 40 leaves the factory, the certificate transfer management host 20 can receive the default transfer device list and the second Internet address through an output/output interface (e.g., inputting from other devices, user through keyboard, mouse, touch screen, etc.) in advance.

In one embodiment, the certificate transfer management host 20 can input the device certificate signal of the device that is expected to be transferred (for example, the certificate serial number of the second certificate management host 30 is the device to be transferred) and the Internet address of the second certificate management host 30 (i.e., the second Internet address) inputted through an output/output interface in advance is added to a transfer list and transfer address table. The certificate transfer management host 20 is used to store the transfer list and transfer address table.

In one embodiment, the transfer device list includes the certificate of the device to be transferred (such as the first certificate) and the second Internet address corresponding to the certificate (for example, the default Internet address of the server that will be transferred to).

In one embodiment, the first certificate management host 10 or the certificate transfer management host 20 can send the transfer device list to the second certificate management host 30 in advance according to the second Internet address, in order to facilitate subsequent verification of the first certificate by the second certificate management host 30.

For example, the certificate transfer management host 20 belongs to company A, and the transfer device list in the certificate transfer management host 20 records a certificate and a second Internet address (for example, the Internet address of B company's server) corresponding to each of 100 devices. These 100 devices will send a request to the server of company B for updating the first certificate to the second certificate based on the second Internet address after these 100 devices leave the factory.

For another example, the certificate transfer management host 20 belongs to company A, and the transfer device list in the certificate transfer management host 20 records each certificate and each second Internet address (for example, the second Internet addresses includes the Internet addresses of the servers of companies B, C, and D) corresponding to each of 100 devices. After these 100 devices are shipped from the factory, each will send a request to the servers of companies B, C, and D for updating the first certificate to the second certificate based on the second Internet address.

However, here are just some examples. The mechanism of certificate transfer is not limited to the application between multiple company's servers, it can also be applied between the user's server and the company's server, or between the multiple user's servers. Please refer to the follow-up description for the detailed method.

In one embodiment, as shown in FIG. 1, after the electronic device 40 is shipped from the factory, the first certificate issued on the electronic device 40 by the company (or production line) area R1 needs to be converted into the second certificate issued by the server in area R2 of the user's own, user's company (or other production line). However, the conversion of the first certificate to the second certificate requires many verification mechanisms, so as not to cause security errors.

The following paragraphs further describe the voucher transfer system and the voucher transfer system method.

In one embodiment, as shown in FIG. 2, after completing the certificate-issuance operation, the electronic device 40 transmits the first certificate to the first certificate host 10 according to the first Internet address (step S1). When the first certificate host 10 verifies that the first certificate is correct and determines that if the first certificate matches one of the certificates in the transfer device list, the first certificate host 10 returns the certificate transfer management host address (such as the address of the certificate transfer management host 20) to the electronic device 40 (step S2). The electronic device 40 transmits the first certificate to the certificate transfer management host according to the address of the certificate transfer management host (step S3). After verifying that the first certificate is correct, the certificate transfer management host 20 transmits a second Internet address (such as the address of the second certificate management host 30) to the electronic device 40 (step S4).

After the first certificate host 10 verifies that the first credential is correct, the first certificate host 10 can query the certificate transfer management host 20 to check whether the first certificate is in the transfer device list to determine whether the electronic device 40 is allowed to transfer the certificate. If the first certificate is not in the transfer device list, the first certificate host 10 returns a transfer failure message to the electronic device 40.

The method for the first certificate host 10 to verify the first certificate and the certificate transfer management host 20 to verify the first certificate is: through a public key infrastructure (PKI) identity verification mechanism, performing multiple verification operations on the first certificate by the intermediate certificate devices 12 and 22. These verification operations include: confirming that the electronic device 40 does have the first certificate, confirming that the first certificate is a leaf certificate in X.509 certificate chain technology, checking that the first certificate is not in a certificate revocation list, and checking a valid time of the device certificate has not expired.

In one embodiment, when the first certificate passes all verification operations, the first certificate host 10 transmits a verification success message to the electronic device 40 and allows the electronic device 40 to perform subsequent operations. For example, the first certificate host 10 sends a message to the electronic device 40. When the first certificate fails to pass all verification operations, the first certificate host 10 sends a verification failure message to the electronic device 10.

In terms of cryptography, the public key infrastructure architecture links the user's personal identity with the public key through a digital certificate certification authority. The user identity of each certificate center user must be unique. The link relationship is established through the registration and release process, depending on the guarantee level. The link relationship can be completed by various software of the certificate center or under human supervision. The role of determining the link relationship of the public key infrastructure is called the registry. The registry management center ensures that the public key and personal identity link are non-repudiation. The public key infrastructure construction is a known technology, so it won't further describe here.

In one embodiment, the intermediate certificate device 12 is located in the first certificate management host 10. The intermediate certificate device 12 is an X.509 certificate device. The first certificate generated by the intermediate certificate device 12 is a first X.509 certificate. The first certificate is a leaf certificate in X.509 certificate chain technology, and the leaf certificate is encrypted with an asymmetric key.

In one embodiment, the intermediate certificate devices 12, 22, and 32 are all X.509 certificate devices, using a tree structure or a hierarchical structure of certificate generation methods.

In one embodiment, the first certificate management host 10 generates a root certificate. The first certificate management host 10 generates an intermediate certificate according to the root certificate. The first certificate management host 10 generates a leaf certificate according to the intermediate certificate, and regards the leaf certificate as the first certificate.

In one embodiment, as shown in FIG. 2, the electronic device 40 transmits the first certificate to a second certificate management host 30 according to the second Internet address (step S5). After verifying that the first certificate is correct, the second certificate management host 30 issues a second certificate, and transmits the second certificate to the electronic device 40 (step S6). The electronic device 40 sends a connection request to the second certificate management host 30 with the second certificate (step S7).

In one embodiment, after step S7, when the second certificate management host 30 determines that the second certificate is correct, the electronic device 40 is allowed to perform subsequent operations. For example, the electronic device 40 accesses the data in the second certificate management host 30. In this way, the certificate transfer operation is completed.

The method for the second certificate management host 30 to verify the second certificate is to use the public key infrastructure to establish an identity verification mechanism, and the intermediate certificate device 32 performs multiple verification operations on the second certificate. These verification operations include: confirming that the electronic device 40 does have the second certificate, confirming that the second certificate is a leaf certificate in X.509 certificate chain technology, checking that the first certificate is not in a certificate revocation list, and checking a valid time of the device certificate has not expired.

In one embodiment, when the second certificate passes all the verification operations, the second certificate management host 30 transmits a verification success message to the electronic device 40 and allows the electronic device 40 to perform subsequent operations. For example, electronic device 40 accesses the file in the second certificate management host 30. When the second certificate does not pass all verification operations, the second certificate management host 30 sends a verification failure message to the electronic device 40.

In one embodiment, the intermediate certificate device 32 is located in the second certificate management host 30. The intermediate certificate device 32 is an X.509 certificate device. The first certificate generated by the intermediate certificate device 12 is a first X.509 device. The second certificate generated by the intermediate certificate device 32 is a second X.509 certificate. The second certificate is a leaf certificate in X.509 certificate chain technology. The second X.509 certificate is encrypted with an asymmetric key.

In one embodiment, the second certificate management host 30 generates a root certificate, and the second certificate management host 30 generates an intermediate certificate according to the root certificate. The second certificate management host 30 generates a leaf certificate according to the intermediate certificate, and regards the leaf certificate as the second certificate.

Figure 3:
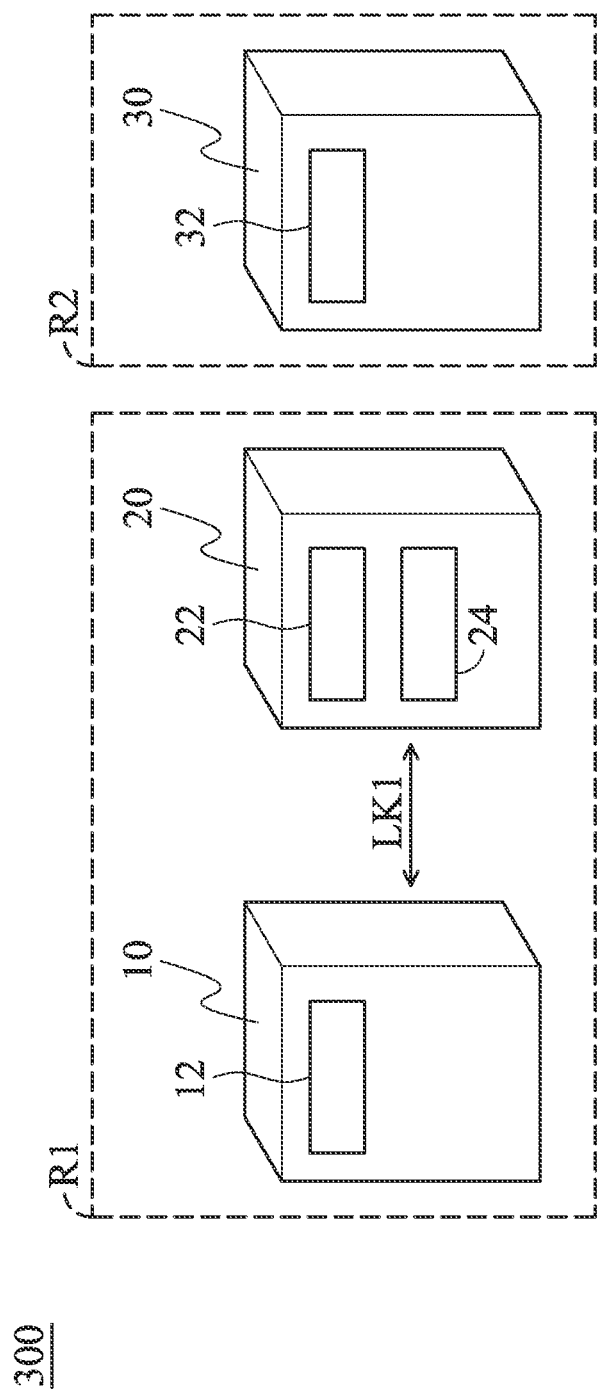
FIG. 3 is a schematic diagram of a configuration 300 of the certificate transfer system in accordance with one embodiment of the present disclosure.

In one embodiment, please refer to FIG. 3, FIG. 3 is a schematic diagram of a configuration 300 of the certificate transfer system in accordance with one embodiment of the present disclosure. In an example, the equipment in area R1 can be regarded as the equipment of the manufacturer (Party A), and the equipment in area R2 can be regarded as the equipment of the purchaser (Party B). The equipment of Party A includes a first certificate management host 10 and a certificate transfer management host 20. The first certificate management host 10 can use the certificate transfer management host 20 to include an intermediate certificate device 22 and a transfer list and transfer address table 24.

In one embodiment, the first certificate management host 10 and the certificate transfer management host 20 establish a communication link LK1 through wireless communication (for example, using Wi-Fi, 3G, 4G, 5G, LTE, etc.) or wired communication.

In one embodiment, the area R2 includes the second certificate management host 30.

In one embodiment, the intermediate certificate device 12 is located in the first certificate management host 10. The intermediate certificate device 12 is an X.509 certificate device. The first certificate generated by the intermediate certificate device 12 is a first X.509 certificate. The first certificate is a leaf certificate in X.509 certificate chain technology. The leaf certificate is encrypted with an asymmetric key.

In one embodiment, the intermediate certificate devices 12, 22, and 32 are all X.509 certificate devices, using a tree structure or a hierarchical structure of certificate generation methods.

In one embodiment, the intermediate certificate devices 12, 22, and 32 are all X.509 certificate devices, and each generates its own intermediate certificate.

In one embodiment, Party A deploys the first certificate management host 10 (also known as the device certificate lifecycle management host) to generate Party A's root certificate (Root X.509 CA) and intermediate certificate (*Intermedia* X.509 CA). When electronic equipment is produced on the production line, Party A's intermediate certificate (*Intermedia* X.509 CA) signs the device certificate (Device X.509 cert) belonging to this device for each networked device. In one embodiment, the first certificate management host 10 can use the method described in the corresponding paragraph of the certificate transfer system 100 in FIG. 1 to sign the electronic device.

The electronic device is a networked device that has a network connection function, such as a mobile phone, a tablet, a laptop, etc.

Next, Party A deploys the certificate transfer management host 20 (also called a device certificate transfer management host). Party B deploys the second certificate management host 30 (also known as the device certificate lifecycle management host). Party B generates a root certificate (Root X.509 CA) and an intermediate certificate (Intermedia X.509 CA) on the second certificate management host 30. Party B imports the intermediate certificate (Intermedia X.509 CA) of Party A's certificate transfer management host 20 on the second certificate management host 30. The list of expected transfer devices and the transfer address are recorded in the certificate transfer management host 20 of Party A (the transfer device is, for example, the second certificate management host 30 of Party B).

Figure 4:
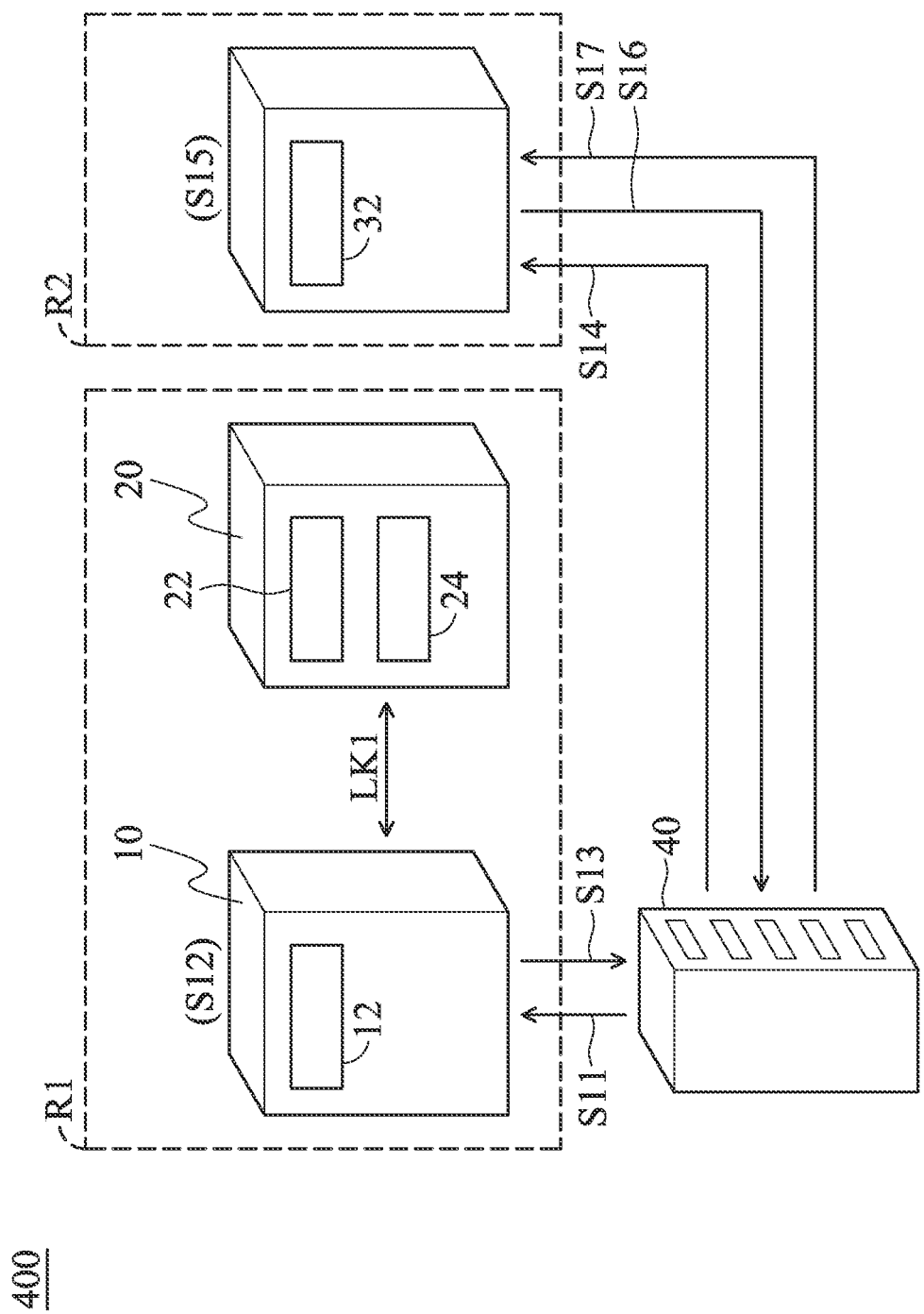
FIG. 4 is a schematic diagram of an automatic transfer electronic device identity method 400 in accordance with one embodiment of the present disclosure.

In one embodiment, please refer to FIG. 4, FIG. 4 is a schematic diagram of an automatic transfer electronic device identity method 400 in accordance with one embodiment of the present disclosure. In an example, the equipment in area R1 can be regarded as the equipment of the manufacturer (Party A), and the equipment in area R2 can be regarded as the equipment of the purchaser (Party B). The equipment of Party A includes a first certificate management host 10 and a certificate transfer management host 20. The first certificate management host 10 can use the intermediate certificate device 22 and the transfer list and transfer address table 24 included in the certificate transfer management host 20.

In one embodiment, the first certificate management host 10 and the certificate transfer management host 20 establish a communication link LK1 through wireless communication (for example, using Wi-Fi, 3G, 4G, 5G, LTE, etc.) or wired communication.

In one embodiment, the area R2 includes the second certificate management host 30.

In one embodiment, the intermediate certificate device 12 is located in the first certificate management host 10. The intermediate certificate device 12 is an X.509 certificate device. The first certificate generated by the intermediate certificate device 12 is a first X.509 certificate. The first certificate is a leaf certificate in X.509 certificate chain technology. The leaf certificate is encrypted with an asymmetric key.

In one embodiment, the intermediate certificate devices 12, 22, and 32 are all X.509 certificate devices, using a tree structure or a hierarchical structure of certificate generation methods.

In one embodiment, the intermediate certificate devices 12, 22, and 32 are all X.509 certificate devices, and each generates its own intermediate certificate.

In one embodiment, when the electronic device 40 (i.e., the networked device) is activated, the electronic device 40 sends a connection request carrying the original device certificate (Device X.509 Cert) of the party A (Step S11).

After the first certificate management host 10 of Party A confirms the original device certificate (Device X.509 Cert) of the electronic device 40, the first certificate management host 10 obtains the network URL from the certificate transfer management host 20 of Party A. Therefore, the electronic device 40 is in the transfer list, and this network URL is the network URL of the second certificate management host 30 of Party B (step S12).

The first certificate management host 10 of Party A returns the network URL of the second certificate management host 30 of Party B to the electronic device 40 (step S13).

The electronic device 40 carries the device certificate (Device X.509 Cert) of Party A and sends a connection request to the second certificate management host 30 of Party B (step S14).

After Party B's second certificate management host 30 uses the intermediate certificate (Intermedia X.509 CA) of Party A's certificate transfer management host 20 to verify that the issuing unit of this sub-device 40 is Party A's first certificate management host 10, using the intermediate certificate (Intermedia X.509 CA) of the second certificate management host 30 of Party B for the electronic device 40 reissuing the device certificate (step S15).

The second certificate management host 30 of Party B returns the new device certificate to the electronic device 40 (step S16).

The electronic device 40 carries the new device certificate (Device X.509 Cert) and sends a connection request to the second certificate management host 30 of Party B (step S17).

The method of the present invention, or a specific type or part thereof, can exist in the form of code. The code can be contained in physical media, such as floppy disks, CDs, hard disks, or any other machine-readable (such as computer-readable) storage media, or not limited to external forms of computer program products. When the program code is loaded and executed by a machine, such as a computer, the machine becomes a device for participating in the present invention. The code can also be transmitted through some transmission media, such as wire or cable, optical fiber, or any transmission type. When the code is received, loaded and executed by a machine, such as a computer, the machine becomes used to participate in this Invented device. When implemented in a general-purpose processing unit, the program code combined with the processing unit provides a unique device that operates similar to the application of specific logic circuits.

The certificate transfer system and certificate transfer method of the present invention provide a method for automatically transferring the certificates for electronic equipment. The certificate transfer mechanism is not limited to the application between the company and the company's server, but can also be applied between the user's server and the company's server. With this method, the equipment purchaser can safely automatically transfer a large number of networked electronic devices from the equipment vendor to the equipment purchaser's networked equipment maintenance platform.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A certificate transfer system, comprising:
   a first certificate management host, configured to generate a first certificate, sign an electronic device with the first certificate, and transmit a first Internet address to the electronic device to complete a certificate-issuance operation; and
   a certificate transfer management host, configured to store a transfer device list and a second Internet address;
   wherein when the first certificate management host receives the first certificate issued by the electronic device, the first certificate management host verifies that the first certificate is correct and determines that if the first certificate matches one of the certificates in the transfer device list, the first certificate management host returns a certificate transfer management host address to the electronic device, the first certificate is sent by the electronic device to the certificate transfer management host according to the certificate transfer management host address, the certificate transfer management host verifies that the first certificate is correct, and then the certificate transfer management host sends the second Internet address to the electronic device, and the first Internet address is different than the second Internet address.

2. The certificate transfer system of claim 1, further comprising:
   a second certificate management host, configured to import the transfer device list and the second Internet address of the certificate transfer management host;
   wherein a transfer list and transfer address table comprise the transfer device list and the second Internet address, and the transfer list and transfer address table are stored in the first certificate management host.

3. The certificate management system of claim 1, wherein the electronic device transmits the first certificate to a second certificate management host according to the second Internet address;
   after the second certificate management host verifies that the first certificate is correct, the second certificate management host issues a second certificate, and transmits the second certificate to the electronic device, and the electronic device sends a connection request to the second certificate management host using the second certificate.

4. The certificate management system of claim 3, wherein a second intermediate certificate device is in the second certificate management host, the second intermediate certificate device is an X.509 certificate device, and the second certificate generated by the second intermediate certificate device is a second X. 509 certificate;

wherein the second certificate is a leaf certificate in an X.509 certificate chain technology, and the second X.509 certificate is encrypted with an asymmetric key.

5. The certificate management system of claim 1, wherein the first certificate management host uses a public key infrastructure (PKI) identity verification mechanism to perform a plurality of verification operations on the first certificate using an intermediate certificate device, the verification operations comprising:
confirming that the electronic device does have the first certificate;
confirming that the first certificate is a leaf certificate in an X.509 certificate chain technology;
checking that the first certificate is not in a certificate revocation list; and
checking that a valid time of the electronic device first certificate has not expired.

6. The certificate management system of claim 1, wherein when the first certificate management host is used to generate a root certificate, the first certificate management host generates an intermediate certificate according to the root certificate, the first certificate management host generates a leaf certificate according to the intermediate certificate, and regards the leaf certificate as the first certificate.

7. The certificate management system of claim 6, wherein a first intermediate certificate device is in the first certificate management host, the first certificate management host is an X.509 certificate device, and the first certificate generated by the first intermediate certificate device is a first X.509 certificate;
wherein the first certificate is the leaf certificate in an X.509 certificate chain technology, and the leaf certificate is encrypted with an asymmetric key.

8. A certificate transfer method, comprising:
using a first certificate management host to generate a first certificate, signing an electronic device with the first certificate, and transmitting a first Internet address to the electronic device to complete a certificate-issuance operation; and
using a certificate transfer management host to store a transfer device list and a second Internet address;
wherein when the first certificate management host receives the first certificate issued by the electronic device, the first certificate management host verifies that the first certificate is correct and determines that if the first certificate matches one of the certificates in the transfer device list, the first certificate management host returns a certificate transfer management host address to the electronic device, the first certificate is sent by the electronic device to the certificate transfer management host according to the certificate transfer management host address, the certificate transfer management host verifies that the first certificate is correct, and then the certificate transfer management host sends the second Internet address to the electronic device, and the first Internet address is different than the second Internet address.

9. The certificate transfer method of claim 8, further comprising:
importing the transfer device list and the second Internet address of the certificate transfer management host by a second certificate management host;
wherein a transfer list and transfer address table comprise the transfer device list and the second Internet address, and the transfer list and transfer address table are stored in the first certificate management host.

10. The certificate management method of claim 8, wherein the electronic device transmits the first certificate to a second certificate management host according to the second Internet address;
after the second certificate management host verifies that the first certificate is correct, the second certificate management host issues a second certificate, and transmits the second certificate to the electronic device, and the electronic device sends a connection request to the second certificate management host using the second certificate.

11. The certificate management method of claim 10, wherein a second intermediate certificate device is in the second certificate management host, the second intermediate certificate device is an X.509 certificate device, and the second certificate generated by the second intermediate certificate device is a second X. 509 certificate;
wherein the second certificate is a leaf certificate in an X.509 certificate chain technology, and the second X.509 certificate is encrypted with an asymmetric key.

12. The certificate management method of claim 8, wherein the first certificate management host uses a public key infrastructure (PKI) identity verification mechanism to perform a plurality of verification operations on the first certificate using an intermediate certificate device, the verification operations comprising:
confirming that the electronic device does have the first certificate;
confirming that the first certificate is a leaf certificate in an X.509 certificate chain technology;
checking that the first certificate is not in a certificate revocation list; and
checking that a valid time of the electronic device first certificate has not expired.

13. The certificate management method of claim 8, wherein when the first certificate management host is used to generate a root certificate, the first certificate management host generates an intermediate certificate according to the root certificate, the first certificate management host generates a leaf certificate according to the intermediate certificate, and regards the leaf certificate as the first certificate.

14. The certificate management method of claim 13, wherein a first intermediate certificate device is in the first certificate management host, the first certificate management host is an X.509 certificate device, and the first certificate generated by the first intermediate certificate device is a first X.509 certificate;
wherein the first certificate is the leaf certificate in an X.509 certificate chain technology, and the leaf certificate is encrypted with an asymmetric key.

* * * * *